United States Patent [19]

Shamir et al.

[11] Patent Number: 5,267,128
[45] Date of Patent: Nov. 30, 1993

[54] FACIA MOUNTED FOR LAMP ASSEMBLY

[75] Inventors: Samuel Shamir, Bloomfield Hills; John H. Schult, Jr., Royal Oak, both of Mich.

[73] Assignee: Chrysler Corporation, Highland Park, Mich.

[21] Appl. No.: 966,491

[22] Filed: Oct. 26, 1992

[51] Int. Cl.⁵ .............................................. B60Q 1/00
[52] U.S. Cl. ......................................... 362/82; 362/66
[58] Field of Search ........................... 362/66, 80, 82

[56] References Cited

U.S. PATENT DOCUMENTS

| | | | |
|---|---|---|---|
| 1,617,423 | 2/1927 | Seitz | 362/80 |
| 2,579,653 | 12/1951 | Dawley | 362/80 |
| 3,629,748 | 2/1972 | Pearson et al. | 362/82 |
| 3,710,097 | 1/1973 | Bright et al. | 362/80 |
| 4,270,787 | 6/1981 | Savell | 362/82 |
| 4,325,105 | 4/1982 | Scimonelli | 362/80 |
| 4,843,531 | 6/1989 | Mochizuki et al. | 362/80 |
| 5,138,542 | 8/1992 | Daumueller et al. | 362/66 |

Primary Examiner—Richard A. Bertsch
Assistant Examiner—Michael I. Kocharov
Attorney, Agent, or Firm—Edward A. Craig

[57] ABSTRACT

A fog lamp assembly has a retainer for the fog lamp and is mounted in a socket in the plastic facia covering the front bumper of an automobile. The rear wall at the base of the socket covers only the lower portion of the base, providing an open space above the rear wall. The upper edge of the rear wall has laterally spaced notches, and studs projecting rearwardly from the retainer are secured in these notches by nuts. When the lamp and retainer are manipulated during installation and removal, the studs enter and exit the notches through the open tops of the notches and also through the open space above the rear wall. Preferably the rear part of the annular wall of the socket is cut away to provide an extension of the open space.

9 Claims, 3 Drawing Sheets

FACIA MOUNTED FOR LAMP ASSEMBLY

This invention relates generally to a facia mounted fog lamp assembly for automobiles.

BACKGROUND AND SUMMARY

Many modern automobiles have a plastic ornamental facia covering the front bumper. The facia is sometimes formed with sockets for receiving fog lamps. Typically, the fog lamps are mounted in the sockets by screws threaded into plastic bosses on the facia. However, this arrangement makes installation and removal of the fog lamps difficult and in addition, the screw threads in the bosses have a tendency to strip particularly after servicing.

In accordance with the present invention, the rear wall at the base of the socket in which the fog lamp is mounted preferably covers only a portion of the base, providing an open space above the rear wall. The upper edge of the rear wall has laterally spaced notches, and studs projecting rearwardly from the fog lamp retainer are secured in these notches by nuts. The studs and nuts are formed of metal and not subject to stripping. When the fog lamp and retainer are manipulated during installation and also during removal, the studs enter and exit the notches through the open tops of the notches and through the open space above the rear wall. Preferably, the rear part of the annular wall of the socket is cut away to provide an extension of this open space.

It is an object of this invention to provide a facia mounted fog lamp assembly having the foregoing features.

Other objects are to provide a facia mounted fog lamp assembly which is rugged and durable in use, which is relative inexpensive, and easy to manufacture, assemble and install.

Other objects, features and advantages of the invention will become more apparent from the following description, especially when considered with the accompanying drawings.

DETAILED DESCRIPTION

Figure 1:
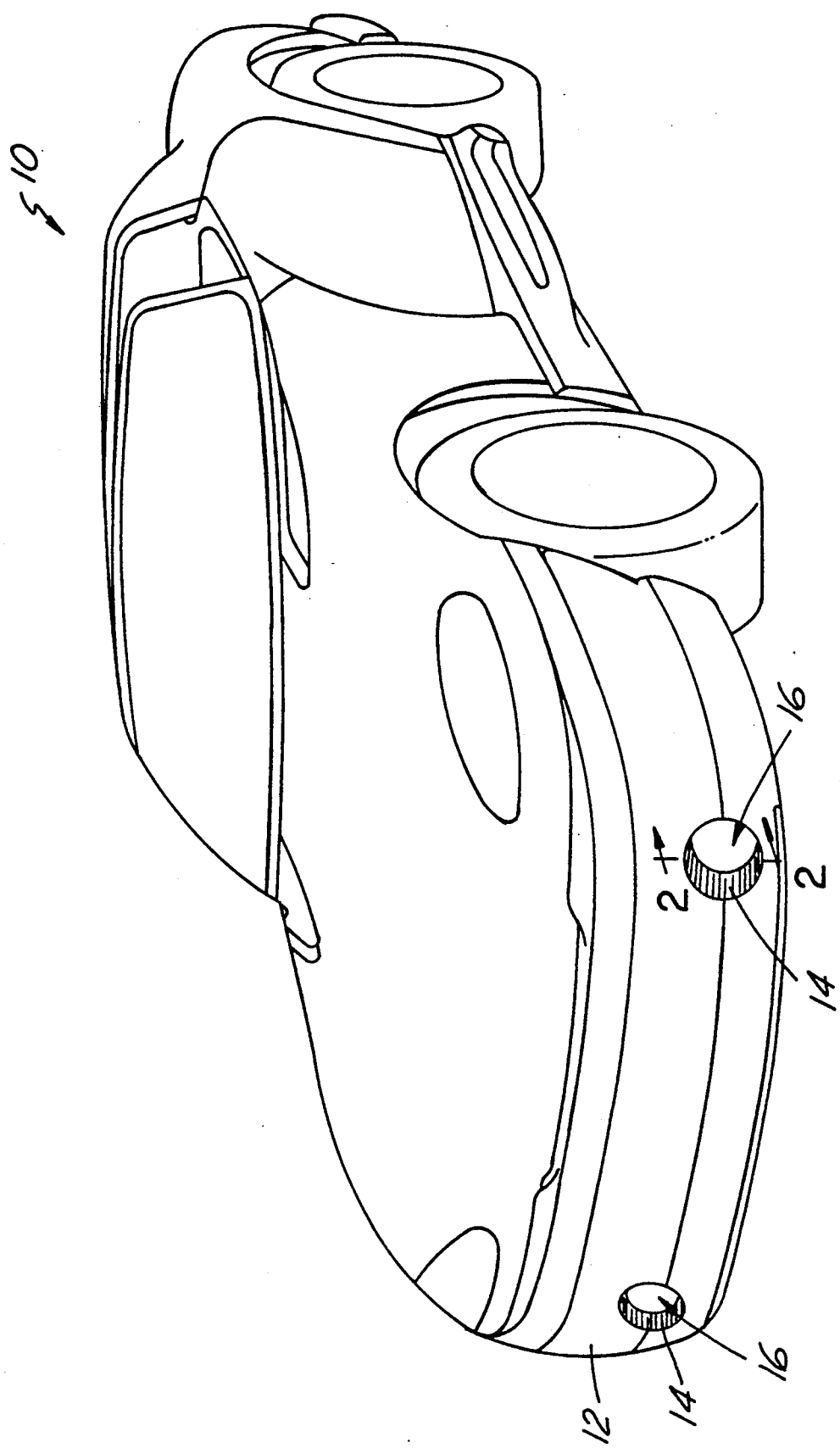
FIG. 1 is a perspective view of an automobile having a facia covering the front bumper and provided with sockets in which fog lamp assemblies are mounted, in accordance with the invention.
Figure 2:
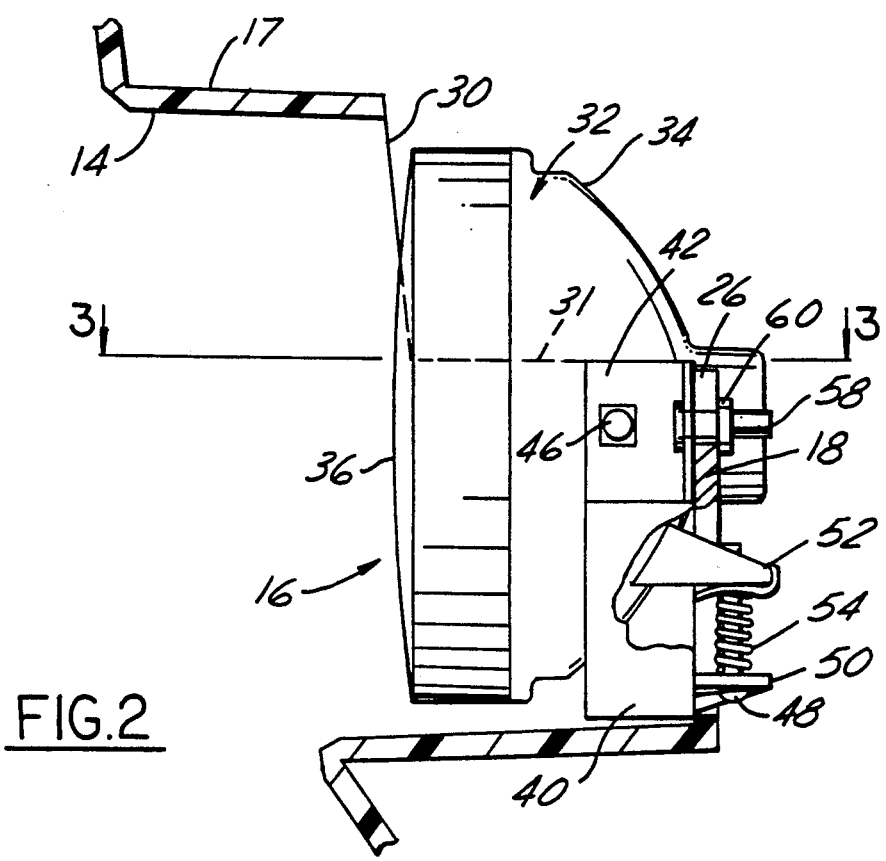
FIG. 2 is a sectional view taken on the line 2—2 in FIG. 1.
Figure 3:
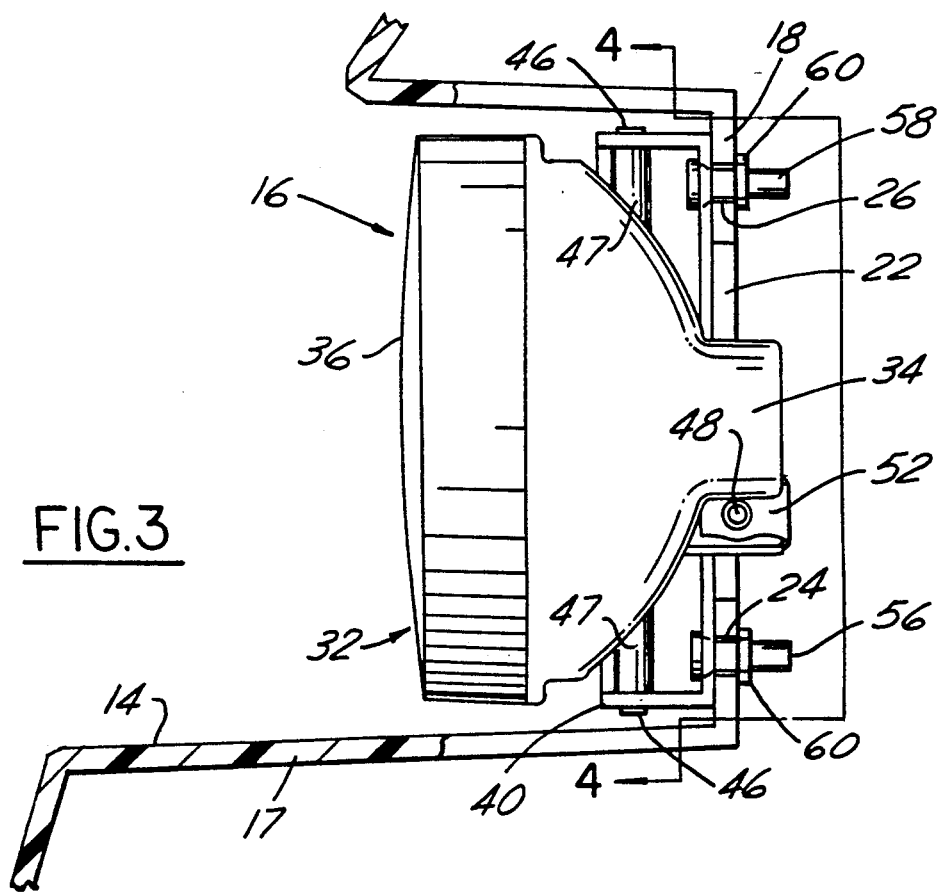
FIG. 3 is a sectional view taken on the line 3—3 in FIG. 2.
Figure 4:
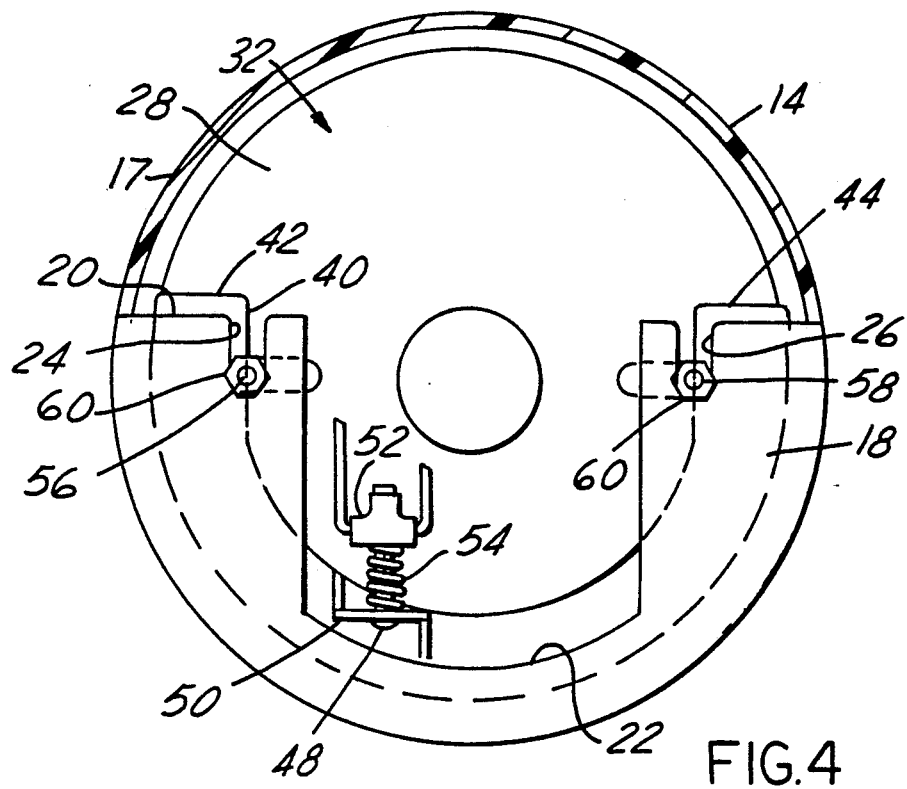
FIG. 4 is a sectional view taken on the line 4—4 in FIG. 3.
Figure 5:
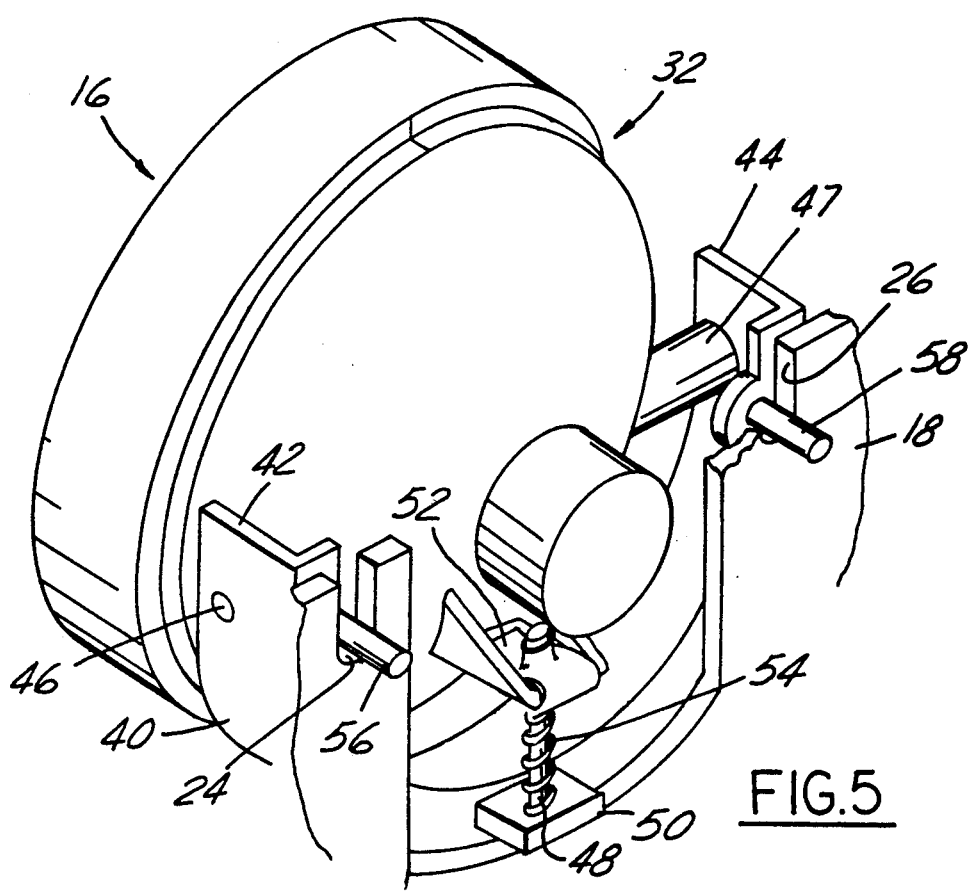
FIG. 5 is a fragmentary perspective view of the facia mounted fog lamp assembly.

Referring now more particularly to the drawings, the automobile 10 has a plastic facia 12 covering the front bumper (not shown). The facia 12 follows the general contour of the bumper and is formed with laterally spaced recesses or sockets 14. Sockets 14 open forwardly and each is adapted to receive a lamp assembly such as the fog lamp assembly 16.

Each socket 14 has an annular side wall 17 which is preferably cylindrical and has a horizontal axis extending longitudinally of the automobile. A transverse rear wall 18 at the base of the socket is preferably perpendicular to the side wall. The rear wall 18 covers only the lower portion of the base and has a horizontal upper edge 20 extending across the socket which is formed centrally with a deep recess 22 and laterally spaced notches 24 and 26 on opposite sides of the recess. The notches 24 and 26 are vertically elongated and are open through the upper edge of the rear wall. The upper edge is located at about the mid-point or slightly above in the overall height of the socket and the space above the upper edge is a substantially unobstructed open space or area 28. The arcuate rear part of the top portion of the annular wall 17 is cut away at 30 down to the side edges 31 which are about level with the upper edge 20 of the rear wall to provide an extension of this open area.

Each lamp assembly 16 includes an electric lamp 32, in this instance a fog lamp, of more or less conventional construction having a housing 34 for the operative parts of the lamp and a transparent or translucent lens 36 covering the front of the housing.

Each lamp 32 is carried by a retainer 40. The retainer is a generally U-shaped frame having upstanding side frame portions 42 and 44. Aligned horizontal pivot pins 46 projecting outwardly from the horizontal bars 47 on the lamp housing 34 rotatably engage in holes in the side frame portions 42 and 44 of the retainer to mount the lamp for pivotal movement. The angular position of the lamp is adjustable by means of a screw 48 rotatably mounted in a bracket 50 on retainer 40 which threadedly engages a bracket 52 on the lamp housing. A compression coil spring 54 encircles the screw 48 between brackets 50 and 52.

A pair of threaded studs 56 and 58 preferably formed of a hard metal such as steel are rigidly secured to and project rearwardly from the retainer 40. These studs are generally horizontal and extend through the notches 24 and 26 when the lamp assembly is installed. Nuts 60, also preferably of a hard metal such as steel, are threaded on the studs at the back of the rear wall 18 and secure each lamp assembly 16 in fixed position within its socket 14. The recess 22 in the rear wall 18 provides clearance for the back of the lamp housing 34. There is also clearance between the lamp housing 34 and the bottom of the annular wall 17 of the socket to allow for angular adjustment of the lamp.

In mounting a lamp assembly 16 in one of the sockets 14, the lamp assembly is manipulated by rocking forwardly and rearwardly about its lower edge portion as necessary to cause the studs 56 and 58 to enter the notches 24 and 26 through the open tops of the notches. The extended open area 28, 30 facilitates entry of the studs into the notches when the lamp assembly is manipulated. The nuts 60 are threaded on the ends of the studs at the back side of the rear wall 18 to clamp the lamp assembly 16 including lamp 32 and retainer 40 to the rear wall. Preferably, the nuts are applied to the studs after the studs are disposed in the notches.

To remove a lamp assembly from its socket, the lamp assembly is manipulated in reverse, after nuts 60 are loosened or removed from the studs. The threads of the hard studs and nuts will withstand numerous assemblies and disassembles without stripping.

What is claimed is:

1. A facia mounted lamp assembly, such as a fog lamp assembly, for automobiles, comprising a lamp, a lamp retainer to which said lamp is secured, a facia for the front bumper of an automobile, said facia being formed with a generally forwardly opening socket for receiving said lamp and retainer, said socket having an annular side wall and a rear wall at the base of said socket, said rear wall covering a portion only of the base of said socket and the remainder of said base being in the form of an open space, said rear wall having an edge portion extending across said socket and defining a margin of said open space, laterally spaced notches in said edge portion of said rear wall having open ends opening through said edge portion into said open space, and means for releasably securing said retainer to said rear wall comprising laterally spaced studs projecting rearwardly from said retainer through said respective notches, said studs being capable of entering and exiting said notches through the open ends thereof and through said open space when said lamp and retainer are manipulated during installation and removal.

2. A facia mounted lamp assembly as defined in claim 1, wherein said facia is formed of a plastic material and said studs are metal.

3. A facia mounted lamp assembly as defined in claim 1, wherein said studs are threaded and nuts are threaded on said studs, said nuts being removable from said studs to facilitate the aforesaid manipulation of said lamp and retainer.

4. A facia mounted lamp assembly as defined in claim 1, wherein the rear portion of said annular wall of said socket is recessed to provide an extension of said open space to facilitate the aforesaid manipulation of said lamp and retainer.

5. A facia mounted lamp assembly as defined in claim 1, wherein said edge portion of said rear wall extends generally horizontally across said socket beneath said open space, and said lamp and retainer are capable of being rocked forwardly and rearwardly about a lower edge portion thereof during the aforesaid manipulation.

6. A facia mounted lamp assembly as defined in claim 5, wherein said studs are threaded and nuts are threaded on said studs, said nuts being removable from said studs to facilitate the aforesaid manipulation of said lamp and retainer, the rear portion of said annular wall of said socket being recessed to provide an extension of said open space and further facilitate the aforesaid manipulation of said lamp and retainer.

7. A facia mounted lamp assembly as defined in claim 6, wherein said lamp is pivoted to said retainer for angular movement, means are provided for adjusting the angular position of said lamp, and clearance is provided between said lamp and said socket to accommodate limited adjustment of said angular position.

8. A facia mounted lamp assembly as defined in claim 7, wherein said edge portion of said rear wall is recessed between said notches to provide clearance for said lamp.

9. A facia mounted lamp assembly a defined in claim 8, wherein said facia is formed of a plastic material and said studs and nuts are metal.

* * * * *

UNITED STATES PATENT AND TRADEMARK OFFICE
CERTIFICATE OF CORRECTION

PATENT NO. : 5,267,128
DATED : November 30, 1993
INVENTOR(S) : Samuel Shamir et al It is certified that error appears in the above-indentified patent and that said Letters Patent is hereby corrected as shown below:

On the title page, Item [54] and in Column 1, line 2, the title should read —Facia Mounted Fog Lamp Assembly—, Signed and Sealed this Thirty-first Day of May, 1994

Attest:

BRUCE LEHMAN

Attesting Officer     Commissioner of Patents and Trademarks